US011834380B2

(12) United States Patent
Cao et al.

(10) Patent No.: US 11,834,380 B2
(45) Date of Patent: Dec. 5, 2023

(54) PREPARATION METHOD OF ALUMINA CERAMIC VALVE CORE CERAMIC CHIP AND PRODUCT THEREOF

(71) Applicant: Xinxing Electronic Ceramics Co., Ltd, Loudi (CN)

(72) Inventors: Jianping Cao, Loudi (CN); Peifu Cao, Loudi (CN); Jianhui Cao, Loudi (CN); Ping Liu, Loudi (CN)

(73) Assignee: Xinxing Electronic Ceramics Co., Ltd, Loudi (CN)

( * ) Notice: Subject to any disclaimer, the term of this patent is extended or adjusted under 35 U.S.C. 154(b) by 0 days.

(21) Appl. No.: 17/389,320

(22) Filed: Jul. 29, 2021

(65) Prior Publication Data

US 2022/0033315 A1  Feb. 3, 2022

(30) Foreign Application Priority Data

Jul. 31, 2020 (CN) .......................... 202010755650.2

(51) Int. Cl.
*C04B 35/622* (2006.01)
*C04B 35/10* (2006.01)
*C04B 35/626* (2006.01)
*C04B 35/109* (2006.01)

(52) U.S. Cl.
CPC ........ *C04B 35/6261* (2013.01); *C04B 35/109* (2013.01); *C04B 2235/5276* (2013.01); *C04B 2235/612* (2013.01); *C04B 2235/6562* (2013.01)

(58) Field of Classification Search
CPC ..................................................... C04B 35/10
See application file for complete search history.

(56) References Cited

U.S. PATENT DOCUMENTS 5,098,571 A * 3/1992 Maebashi ............... C04B 38/00
210/500.25

FOREIGN PATENT DOCUMENTS

| CN | 101067461 A | * | 11/2007 | |
| CN | 101880173 A | * | 11/2010 | |
| CN | 103101945 A | * | 5/2013 | |
| CN | 103101945 A | | 5/2013 | |
| CN | 103360040 A | * | 10/2013 | |
| CN | 103360040 A | | 10/2013 | |
| CN | 104310971 A | * | 1/2015 | |
| CN | 105090553 A | * | 11/2015 | ............... F16K 5/06 |
| CN | 106083032 A | * | 11/2016 | |
| CN | 108704770 A | * | 10/2018 | |
| CN | 108821782 A | * | 11/2018 | |

* cited by examiner

*Primary Examiner* — Cachet I Proctor

(57) ABSTRACT

A preparation method of an alumina ceramic valve core ceramic chip and a product thereof. The alumina ceramic valve core ceramic chip is obtained by the steps of mixing alumina, a sintering aid and a toughening agent according to a raw material ratio, ball-milling, drying, cold isostatic pressing, sintering and the like. The alumina ceramic valve core ceramic chip is prepared by adopting nano alumina and zirconium oxide as the sintering aid, so that the material has excellent bending strength, fracture toughness, hardness and low wear rate, the bending strength can reach 357.8-360.06 MPa, the fracture toughness is 4.32-4.56 MPa$^{1/2}$, the Vickers hardness is 1592.7-1614.8 MPa, the wear rate is 0.04-0.09%, and the alumina ceramic valve core ceramic chip is an ideal material for preparing a faucet valve core.

5 Claims, No Drawings

PREPARATION METHOD OF ALUMINA CERAMIC VALVE CORE CERAMIC CHIP AND PRODUCT THEREOF

CROSS-REFERENCE TO RELATED APPLICATIONS

The application claims priority to Chinese patent application No. 202010755650.2, filed on Jul. 31, 2020, the entire contents of which are incorporated herein by reference

TECHNICAL FIELD

The disclosure belongs to the field of ceramic preparation, and particularly relates to a preparation method of an alumina ceramic valve core ceramic chip and a product thereof.

BACKGROUND

Alumina ceramic ($Al_2O_3$) as structural ceramic has the advantages of high hardness, favorable high-temperature stability, low price and the like, and is widely used in industrial production, but its lower toughness limits further application. On the basis of the alumina ceramic, people generally introduce a sintering aid to improve the corresponding properties of the alumina ceramic so as to meet the current demands. The alumina ceramic is used for preparing the ceramic valve core due to good properties and strength.

The main factors influencing the alumina ceramic include fracture toughness, elastic modulus, bending strength, hardness and the like, the properties of the alumina ceramic can be improved by adding the sintering aid and other materials in the alumina ceramic preparation process, for example, Ge Heyi, etc. studied the structure and properties of micro-grain $Al_2O_3$—$ZrO_2$ ceramic and found that the comprehensive properties of the ceramic are optimal when $TiO_2$—$MgO$ is used as the sintering aid, the sintering temperature is 1600 DEG C and the mass percent of the nano t-$ZrO_2$ particles is 5%, and its density is 98.7%, the folding strength is 274.82 MPa, and the fracture toughness is up to 7.32 $MPa·m^{1/2}$. After Ren Huilan Group added 15% of $ZrO_2$ to toughen the $Al_2O_3$ ceramic, the fracture toughness of the obtained material is 8.42 $MPa·m^{1/2}$, which is enhanced by nearly 50% as compared with the material without addition. The existing main sintering aid mainly includes oxides of Si3N4, SiC, $SiO_2$, $ZrO_2$ and the like which form composite ceramic with alumina ceramic, thereby further enhancing the toughness, strength and hardness of the $Al_2O_3$ ceramic. However, there are no studies to use the nano alumina sintering aid in the alumina ceramic preparation process to enhance the toughness, strength and hardness of the $Al_2O_3$ ceramic in the prior art. The existing study does not have ideal enhancement on the properties of the alumina ceramic, especially when the alumina ceramic is used for preparing a faucet ceramic valve core, there are higher requirements for strength, toughness and the like, and thus, it is urgent to solve the problem of difficulty in enhancing the toughness, strength and hardness of the alumina ceramic at present.

SUMMARY

The disclosure provides a preparation method of an alumina ceramic valve core ceramic chip and a product thereof and aims at solving the defects in the prior art, the alumina ceramic valve core ceramic chip has good compactness and high bending strength, fracture toughness and hardness, i.e. the bending strength of the alumina ceramic valve core ceramic chip is 357.8-360.06 MPa, the fracture toughness is 4.32-4.56 $MPa^{1/2}$, the Vickers hardness is 1592.7-1614.8 MPa, and the wear rate is 0.04-0.09%, and it is an ideal material for preparing a faucet valve core.

The Disclosure Provides:

a preparation method of an alumina ceramic valve core ceramic chip, comprising the steps of:

(1) putting alumina with a purity of more than 99.5 percent, a sintering aid and SiC crystal whiskers into a ball milling tank for ball milling, wherein a ball milling medium is absolute ethyl alcohol; the sintering aid is nano alumina and zirconium oxide, a particle size of the nano alumina is 20 to 30 nm, and an adding amount of the nano alumina is 0.5 to 1 wt %; an adding amount of the zirconium oxide is 0.5 to 1 wt %; and an adding amount of the SiC crystal whiskers is 2 to 5 wt %;

(2) after the ball milling is finished, drying an obtained mixed material; then adding 5% by mass of a polyvinyl alcohol (PVA) water solution, and after ageing for 20 to 30 h, granulating; filling granulated powder into a hard rubber mold sleeve; sealing and then putting into a cold isostatic press for molding; keeping the pressure at 140 MPa to 160 MPa for 5 to 10 min to prepare a blank body, and drying the obtained blank body; then machining the blank body and discharging rubber in a muffle furnace at 600 to 800 DEG C under a microwave auxiliary condition for 1 to 2 h; then sintering at 1500 to 1600 DEG C for 1 to 2 h; cooling to room temperature along the furnace; and finely machining to obtain the alumina ceramic valve core ceramic chip.

Further, wherein in step (1), the average particle size $D_{50}$ of the alumina is 1.5 µm.

Further, wherein in step (1), the ball milling time is 3 to 5 h and the rotary speed is 380 to 420 r/min.

Further, wherein in step (2), the drying is carried out at 80 to 100 DEG C for 4 to 6 h; and the drying is carried out at 60 to 80 DEG C for 12 to 20 h.

Further, wherein in step (2), the temperature rising speed of a glue discharging process is 2 to 3 DEG C/min; and the temperature rising speed of sintering at 1500 to 1600 DEG C for 1 to 2 h is 8 to 10 DEG C/min.

Further, the alumina ceramic valve core ceramic chip prepared by the preparation method, wherein the bending strength of the alumina ceramic valve core ceramic chip is 357.8 to 360.06 MPa, the breaking tenacity is 4.32 to 4.56 $MPa^{1/2}$, the Vickers hardness is 1592.7 to 1614.8 MPa, and the wear rate is 0.04 to 0.09%.

Further, the use of the alumina ceramic valve core ceramic chip, wherein the ceramic valve core ceramic chip is used for preparing a faucet ceramic valve core, the faucet ceramic valve core is composed of a fixed chip and a movable chip, the movable chip is of a symmetrical sector structure, and the water flow can be adjusted by selecting a movable valve core.

Compared with the prior art, the disclosure at least has the following beneficial effects:

1) Alumina, a sintering aid and SiC whiskers are mixed according to the raw material proportion, ball milling and drying are carried out, cold isostatic pressing for molding, sintering and the like are carried out to obtain the alumina ceramic valve core ceramic chip; nano alumina and zirconium oxide are used as the sintering aid, SiC whiskers are used as a toughening agent to prepare the alumina ceramic valve core ceramic chip, the material has excellent bending strength, fracture toughness, hardness and low wear rate; the bending strength can reach 357.8-360.06 MPa, the fracture toughness is 4.32-4.56 $MPa^{1/2}$, the Vickers hardness is 1592.7-1614.8 MPa: and the wear rate is 0.04-0.09%, so that the material is an ideal material for preparing the faucet valve core; and 2) The nano alumina and the zirconium oxide are adopted as the sintering aid together, and the synergistic effect between the nano alumina and the zirconium oxide is utilized to promote the compactness of the alumina ceramic to be obviously improved, thereby improving the bending strength, fracture toughness and hardness, and reducing the wear rate, and simultaneously the SiC whiskers are added to further reduce the wear rate, and meanwhile, the nanometer effect of the nano alumina is utilized to enable alumina ceramic to have high compactness and outstanding performances.

3) The rubber discharge treatment is carried out under the microwave-assisted condition, thereby promoting the discharge of gas and enabling the alumina ceramic to have good sintering property, further reducing the porosity of the ceramic material, improving the compactness, improving the bending strength and hardness and further reducing the wear rate.

In conclusion, the alumina ceramic valve core ceramic chip prepared by the disclosure is an ideal material for preparing the faucet valve core due to high compactness, good bending strength, fracture toughness and low wear rate.

The technical solution of the disclosure is further described by the following embodiments.

DETAILED DESCRIPTION OF THE EMBODIMENTS

A Preparation Method of an Alumina Ceramic Valve Core Ceramic Chip Provided by the Disclosure Comprises the Steps of:

(1) putting alumina (average particle size $D_{50}$ is 1.5 μm) with a purity of more than 99.5 percent, a sintering aid and SiC crystal whiskers into a ball milling tank for ball milling for 3-5 h at speed of 380-420 r/min, wherein a ball milling medium is absolute ethyl alcohol; the sintering aid is nano alumina and zirconium oxide; the particle size of the nano alumina is 20-30 nm; the adding amount of the nano alumina is 0.5-1 wt %; the adding amount of the alumina is 0.5-1 wt %; and the adding amount of the SiC crystal whiskers is 2-5 wt %; and (2) after the ball milling is finished, drying an obtained mixed material for 4-6 h at the temperature of 80-100 DEG C; then adding 5% by mass of a polyvinyl alcohol (PVA) water solution, and after ageing for 20-30 h, granulating; filling granulated powder into a hard rubber mold sleeve; sealing and then putting into a cold isostatic press for molding; keeping the pressure at 140-160 MPa for 5-10 min to prepare a blank body; drying the obtained blank body for 12-20 h at, the temperature of 60-80 DEG C; then machining the blank body and discharging rubber in a muffle furnace at 600-800 DEG C under a microwave auxiliary condition for 1-2 h; then sintering at 1500-1600 DEG C for 1-2 h under the temperature rising speed of 2-3 DEG C./min; cooling to room temperature along the furnace under the temperature rising speed of 8-10 DEG C/min; and finely machining to obtain the alumina ceramic valve core ceramic chip.

In order to make the purpose, technical scheme and advantages of the embodiments of the disclosure clearer, the technical scheme of the embodiments of the disclosure will be clearly and completely described as following. Obviously, the described embodiments are part of the embodiments of the disclosure, rather than all the embodiments. Usually, the components in the embodiments of the disclosure can be arranged and designed through various configurations. Therefore, the following detailed description of the embodiments of the disclosure is not intended to limit the scope of the disclosure requiring protection, but merely to indicate the selected embodiments of the disclosure. Based on the embodiments of the disclosure, all other embodiments obtained by ordinary technicians in this field without creative labor fall within the scope of the protection of the disclosure.

Embodiment 1

1. A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina and zirconium oxide; the particle size of the nano alumina is 25 nm; the adding amount of the nano alumina is 0.75 wt %; the adding amount of the alumina is 0.75 wt %; and the adding amount of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C./min; and finely machining to obtain the 0.25 alumina ceramic valve core ceramic chip.

Embodiment 2

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 5 h at speed of 380 r/min, wherein a ball milling medium is absolute ethyl alcohol; the sintering aid is nano alumina and zirconium oxide; the particle size of the nano alumina is 30 nm; the adding amount of the nano alumina is 0.5 wt %; the adding amount of the zirconium oxide is 1 wt %; and the adding amount of the SiC crystal whiskers is 5 wt %; and (2) after the ball milling is finished, drying an obtained mixed material for 4 h at the temperature of 100 DEG C; then adding 5% by mass of a polyvinyl alcohol (PVA) water solution, and after awing for 30 h, granulating; filling granulated powder into a hard rubber mold sleeve; sealing and then putting into a cold isostatic press for molding; keeping the pressure at 160 MPa for 5 min to prepare a blank body; drying the obtained blank body for 12 h at the temperature of 80 DEG C; then machining the blank body and discharging rubber in a muffle furnace at 800 DEG C under a microwave auxiliary condition for 1 h; then sintering at 1600 DEG C for 1 h under the temperature rising speed of 3 DEG C/min; cooling to room temperature along the furnace under the temperature rising speed of 10 DEG C/min; and finely machining to obtain the alumina ceramic valve core ceramic chip.

Embodiment 3

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 3 h at speed of 420 r/min, wherein a ball milling medium is absolute ethyl alcohol; the sintering aid is nano alumina and zirconium oxide; the particle size of the nano alumina is 20 nm; the adding amount of the nano alumina is 1 wt %; the adding amount of the zirconium oxide is 0.5 wt %; and the adding amount of the SiC crystal whiskers is 2 wt %; and (2) after the ball milling is finished, drying an obtained mixed material for 6 h at the temperature of 80 DEG C; then adding 5% by mass of a polyvinyl alcohol (PVA) water solution, and after ageing for 20 h, granulating; filling granulated powder into a hard rubber mold sleeve; sealing and then putting into a cold isostatic press for molding; keeping the pressure at 140 MPa for 10 min to prepare a blank body; drying the obtained blank body for 20 h at the temperature of 60 DEG C; then machining the blank body and discharging rubber in a muffle furnace at 600 DEG C under a microwave auxiliary condition for 2 h; then sintering at 1500 DEG C for 2 h under the temperature rising speed of 2 DEG C/min; cooling to room temperature along the furnace under the temperature rising speed of 8 DEG C/min; and finely machining to obtain the alumina ceramic valve core ceramic chip.

Embodiment 4

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina and zirconium oxide; the particle size of the nano alumina is 25 nm; the adding amount of the nano alumina is 1 wt %; the adding amount of the zirconium oxide is 0.5 wt %; and the adding amount, of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging, rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C/min; and finely machining to obtain the alumina ceramic valve core ceramic chip.

Embodiment 5

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina and zirconium oxide; the particle size of the nano alumina is 25 nm; the adding amount of the nano alumina is 0.5 wt %; the adding amount of the zirconium oxide is 1 wt %; and the adding amount of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C/min; and finely machining to obtain the alumina ceramic valve core ceramic chip.

Contrast 1

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina and zirconium oxide; the particle size of the nano alumina is 25 nm; the adding amount of the nano alumina is 0.75 wt %; and the adding amount of the zirconium oxide is 0.75 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C/min; and finely machining to obtain the alumina ceramic valve core ceramic chip.

Contrast 2

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina; the particle size of the nano alumina is 25 nm; the adding amount of the nano alumina is 1.5 wt %; and the adding amount of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C/min; and finely machining to obtain the alumina ceramic valve core ceramic chip.

Contrast 3

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is zirconium oxide; the adding amount of the zirconium oxide is 1.5 wt %; and the adding amount of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C/min; and finely machining to obtain the alumina ceramic valve core ceramic chip.

Contrast 4

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina and zirconium oxide; the particle size of the nano alumina is 100 nm; the adding amount of the nano alumina is 0.75 wt %; the adding amount of the zirconium oxide is 0.75 wt %; and the adding amount of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C/min; and finely machining to obtain the alumina ceramic valve core ceramic chip.

Contrast 5

A Preparation Method of an Alumina Ceramic Valve Core Ceramic Chip Comprises the Steps of:

(1) putting alumina (average particle size $D_{50}$ is 1.5 μm) with a purity of more than 99.5 percent, a sintering aid and SiC crystal whiskers into a ball milling tank for ball milling for 4 h at speed of 400 r/min, wherein a ball milling medium is absolute ethyl alcohol; the sintering aid is nano alumina and zirconium oxide; the particle size of the nano alumina is 25 nm; the adding amount of the nano alumina is 0.75 wt %; the adding amount of the zirconium oxide is 0.75 wt %; and the adding amount of the SiC crystal whiskers is 4 wt %; and (2) after the ball milling is finished, drying an obtained mixed material for 5 h at the temperature of 90 DEG C; then adding 5% by mass of a polyvinyl alcohol (PVA) water solution, and after ageing for 25 h, granulating; filling granulated powder into a hard rubber mold sleeve; sealing and then putting into a cold isostatic press for molding; keeping the pressure at 150 MPa for 8 min to prepare a blank body; drying the obtained blank body for 18 h at the temperature of 70 DEG C; then machining the blank body and discharging rubber in a muffle furnace at 700 DEG C under a microwave auxiliary condition for 1.5 h; then sintering at 1550 DEG C for 1.5 h under the temperature rising speed of 2.5 DEG C/min; cooling to room temperature along the furnace under the temperature rising speed of 9 DEG C./min; and finely machining to obtain the alumina ceramic valve core ceramic chip.

The embodiments 1-5 and the contrasts 1-5 are subjected to mechanical property test.

The Vickers hardness of the material is measured by a micro Vickers hardness tester, the load is 10N, the loading time is 5 S, and the hardness value is the average value of five times of measurement; The bending strength of the sample is tested by a PT-1036PC type universal material tester, the size of the sample is 34 mm*5 mm*5 mm, the span is 16 mm, the pressure head loading speed is 0.5 mm/min, the bending strength is the average value of three measurement results, the fracture toughness of the sample is tested by a single-side notched beam method, and the pressure head speed is 0.05 mm/min; several groups of ceramic parts are taken and mounted on the valve body for a friction and wear test, the wear values are compared by a weight loss method under the same conditions (cycle 40,000 times), and the specific test results are shown in Table 1:

TABLE 1

| Mechanical properties of embodiments 1-5 and contrasts 1-3 | | | | |
|---|---|---|---|---|
| | Hardness Hv (MPa) | Bending strength (MPa) | Fracture toughness (MPa$^{1/2}$) | Wear rate (%) |
| Embodiment 1 | 1614.8 | 360.06 | 4.56 | 0.04 |
| Embodiment 2 | 1601.5 | 358.4 | 4.38 | 0.08 |
| Embodiment 3 | 1592.7 | 357.8 | 4.32 | 0.09 |
| Embodiment 4 | 1606.4 | 359.2 | 4.45 | 0.06 |
| Embodiment 5 | 1610.6 | 359.9 | 4.51 | 0.05 |
| contrast 1 | 1413.5 | 341.5 | 2.43 | 1.14 |
| contrast 2 | 1205.6 | 310.2 | 3.13 | 1.04 |
| contrast 3 | 1365.8 | 336.7 | 3.24 | 0.84 |

TABLE 1-continued

Mechanical properties of embodiments 1-5 and contrasts 1-3

|  | Hardness Hv (MPa) | Bending strength (MPa) | Fracture toughness (MPa$^{1/2}$) | Wear rate (%) |
|---|---|---|---|---|
| contrast 4 | 1495.3 | 346.4 | 3.96 | 0.71 |
| contrast 5 | 1532.5 | 351.3 | 4.03 | 0.32 |

In conclusion, the alumina ceramic valve core ceramic chip prepared by the preparation method has the advantages that the preparation method is simple, and the embodiment 1 and the contrasts 1-5 are compared and the result shows that due to the synergistic effect between nano alumina and zirconium oxide, the hardness, bending strength and fracture toughness of alumina ceramic can be significantly improved, the wear rate is reduced, the hardness Hv and bending strength can reach 1614.8 MPa and 360.06 MPa respectively, the fracture toughness can reach 4.56 MPa$^{1/2}$, and the wear rate is 0.04 at least. Moreover, with the assisting of microwave and by adding SiC whiskers and selecting the particle size of nano alumina, the hardness, the bending strength and the fracture toughness of the alumina ceramic are further improved, and the hardness is reduced.

When the alumina ceramic valve core ceramic chip in the embodiment 1 is used for preparing the alumina ceramic valve core, the valve core is composed of a fixed chip and a movable chip, the movable chip is of a symmetric sector structure, the water flow can be adjusted by selecting the movable valve core, the prepared valve core can meet actual requirements, and the cost can be saved.

What is claimed is:

1. A preparation method of an alumina ceramic valve core ceramic chip, comprising following steps:
    (1) putting alumina with a purity of more than 99.5 percent, a sintering aid and SiC crystal whiskers into a ball milling tank for ball milling, wherein a ball milling medium of absolute ethyl alcohol is used during the ball milling; the sintering aid is nano alumina and zirconium oxide, wherein a particle size of the nano alumina is 20 to 30 nm, and the nano alumina is added in an amount 0.5 to 1 wt %; the zirconium oxide is added in the amount of 0.5 to 1 wt %; and the SiC crystal whiskers is added in the amount of 2 to 5 wt %; and
    (2) after ball milling a mixed material is obtained, drying the obtained mixed material; then adding 5% by mass of a polyvinyl alcohol (PVA) water solution to the mixed material, and after ageing for 20 to 30 h, granulating the mixed material to form a granulated powder; filling the granulated powder into a hard rubber mold sleeve; sealing and then putting into a cold isostatic press for molding at a pressure of 140 MPa to 160 MPa for 5 to 10 min to form a blank body, and drying the obtained blank body; then machining the blank body and performing a rubber discharging treatment in a muffle furnace at 600 to 800 DEG C under a microwave auxiliary condition for 1 to 2 h; then sintering at 1500 to 1600 DEG C for 1 to 2 h; cooling to room temperature along the muffle furnace; and finely machining to obtain the alumina ceramic valve core ceramic chip.

2. The preparation method according to claim 1, wherein in step (1), an average particle size $D_{50}$ of the alumina is 1.5 µm.

3. The preparation method according to claim 1, wherein in step (1), a ball milling time is 3 to 5 h and a rotary speed is 380 to 420 r/min.

4. The preparation method according to claim 1, wherein in step (2), a drying of the obtained mixed material is carried out at 80 to 100 DEG C for 4 to 6 h; and the drying of the obtained blank body is carried out at 60 to 80 DEG C for 12 to 20 h.

5. The preparation method according to claim 1, wherein in step (2), the temperature rising speed of sintering at 1500 to 1600 DEG C for 1 to 2 h is 8 to 10 DEG C/min.

* * * * *